United States Patent [19]

Galindez

[11] 4,372,471

[45] Feb. 8, 1983

[54] GLASS CUTTING SYSTEM

[75] Inventor: Luis Galindez, Llodio-Alava, Spain

[73] Assignee: Vidrierias de Llodio, S.A., Spain

[21] Appl. No.: 198,095

[22] Filed: Oct. 17, 1980

Related U.S. Application Data

[63] Continuation-in-part of Ser. No. 955,071, Oct. 26, 1978, abandoned.

[51] Int. Cl.³ .............................................. B26F 3/00
[52] U.S. Cl. ..................................... 225/1; 225/103; 83/880; 83/886
[58] Field of Search ................. 83/886, 879, 880, 881, 83/882, 483, 490, 574; 225/96, 96.5, 1, 2, 93, 103; 33/27 G, 27 K, 18 R; 30/164.95

[56] References Cited

U.S. PATENT DOCUMENTS

| | | | |
|---|---|---|---|
| 1,511,016 | 10/1924 | Barker | 83/614 X |
| 2,122,258 | 6/1938 | Lovviaux | 33/27 G |
| 2,515,445 | 7/1950 | Gilstrap | 83/886 |
| 2,612,689 | 10/1952 | Kirkman et al. | 33/27 K |
| 3,122,953 | 3/1964 | Atkeson | 225/2 X |
| 3,240,090 | 3/1966 | Bognar | 83/880 |
| 3,392,445 | 7/1968 | Koran et al. | 30/164.95 |
| 3,537,345 | 11/1970 | Luppino | 83/886 |
| 3,865,673 | 2/1975 | De Torre | 225/96.5 X |
| 3,945,278 | 3/1976 | Strauss | 83/886 |
| 4,171,657 | 10/1979 | Halberschmidt et al. | 83/886 |
| 4,210,052 | 7/1980 | Fisher | 83/886 X |

*Primary Examiner*—James M. Meister
*Attorney, Agent, or Firm*—Sheridan Neimark; Karl W. Flocks

[57] ABSTRACT

A glass cutting system comprising a header element having a close end adjacent the glass to be cut and an end remote from the glass to be cut, the header element housing therein a pneumatic or like power generator, the header element being displaceably supported at its end farthest remote from the glass to be cut in such a way that with the close end in glass cutting contact the header supplies constant power to a roulette mounted on a shaft on the header to the extent that the roulette impinges upon the glass with the shaft sensibly parallel to the plane of the glass.

1 Claim, 13 Drawing Figures

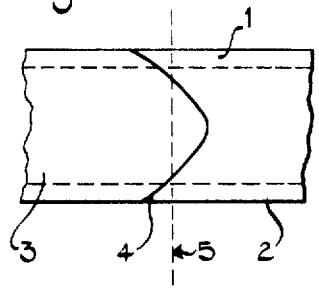
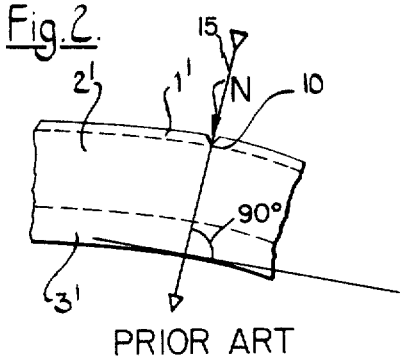
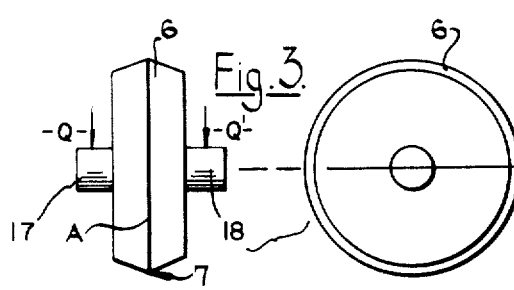
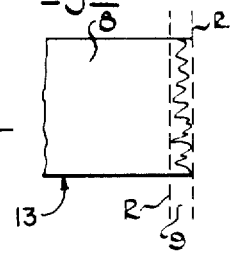
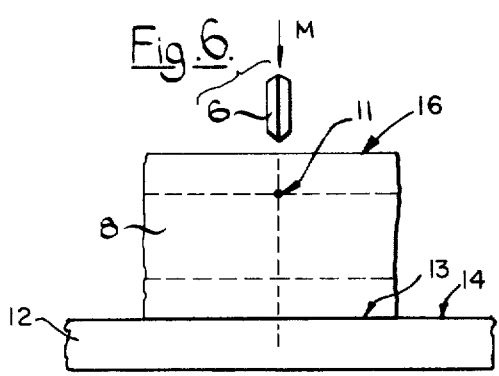
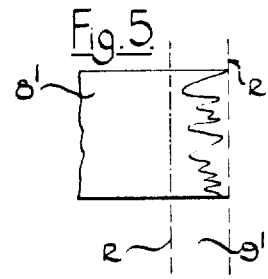
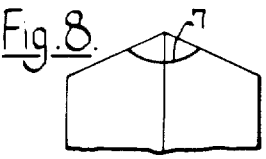
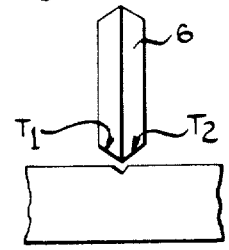

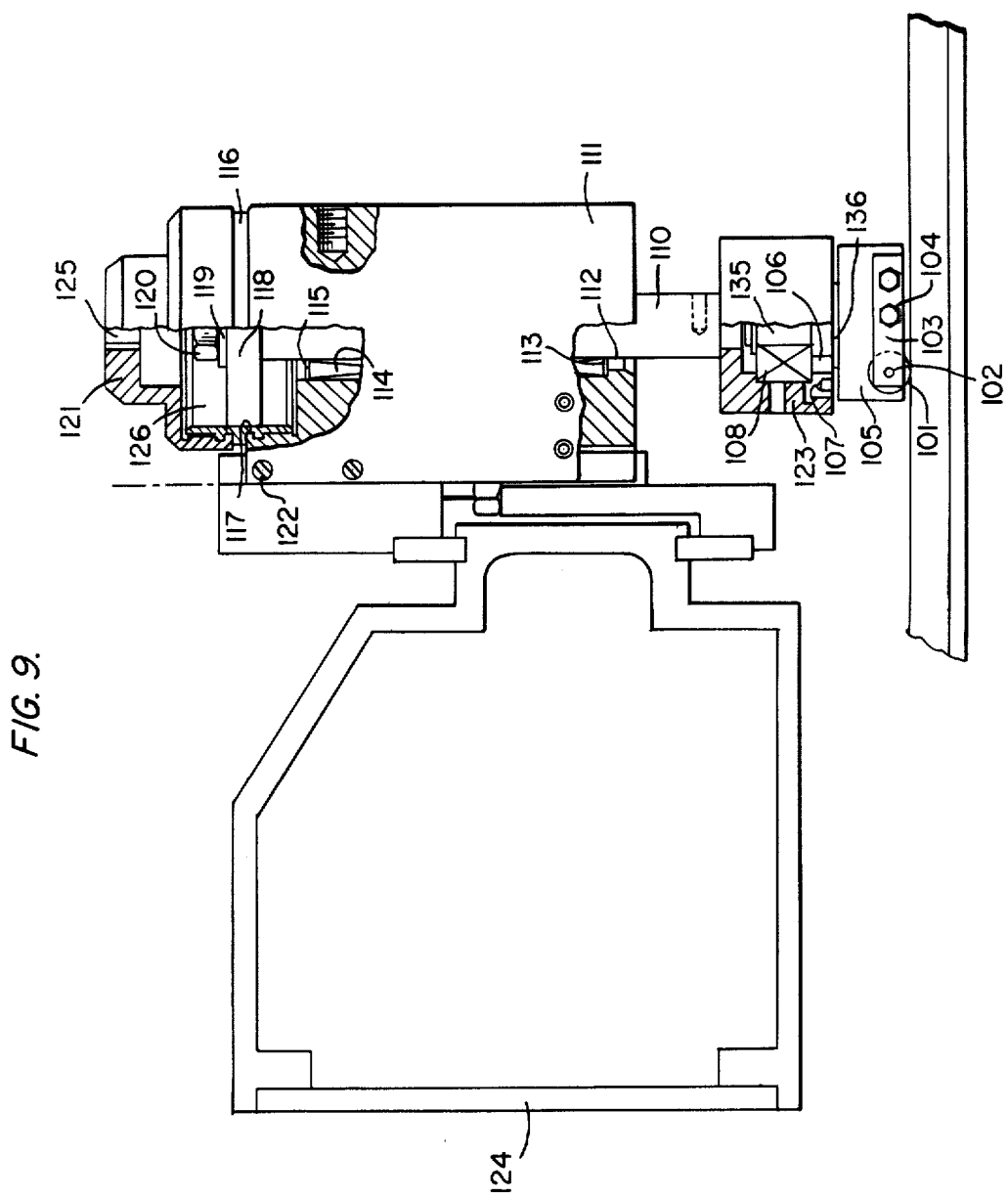

GLASS CUTTING SYSTEM

This application is a continuation-in-part of my copending application Ser. No. 955,071, filed Oct. 26, 1978, now abandoned.

BACKGROUND OF THE INVENTION

1. Field of the Invention

The field of the invention relates to a system which provides glass cutting in thicknesses which until the present entailed the usage of comparatively costly and complicated techniques.

2. Description of the Prior Art

Heretofore the known prior art procedures which are usually used for glass cutting for thicknesses of up to 6 millimeters, for example, the normal technique consists in using a roulette which due to its sharp circumferential edge, incised upon the glass surface, cutting it, and later on polishing and chamfering the resulting edges.

In cutting glass at thicknesses above 6 mm. as in this case in point, the problem of a long and arduous procedure must be used, which consists in carrying out the cut by means of a normal performance with special punches along a marked crack or incision on the glass, along the line where same should appear. The theoretical basis of this procedure, is also noted in this regard as well as chemical attack or treatment procedures which have also been tried out.

In accordance with the prior art glass cutting is carried out with relatively large diameter cutting roulette by combining color, previous marking, and flexure. In contrast to the prior art procedures the present invention relates to an extremely simple process by which glass cutting is achieved in a single operation without application of any bending moment throughout the entire process.

BRIEF DESCRIPTION OF THE DRAWINGS

For a better understanding of the invention, as well as of the manner whereby the advantages of same may be obtained, reference is made to the attached sheets of drawings on which the inventive concept appears, which is given as an example in a non-limitative realization of the invention.

IN THE DRAWINGS

Figure 10:
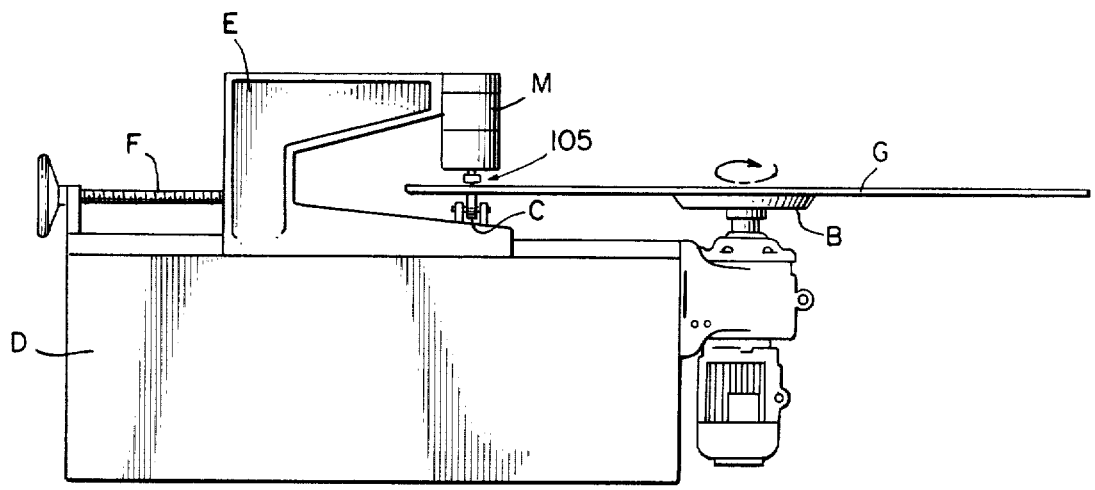
Figure 11:
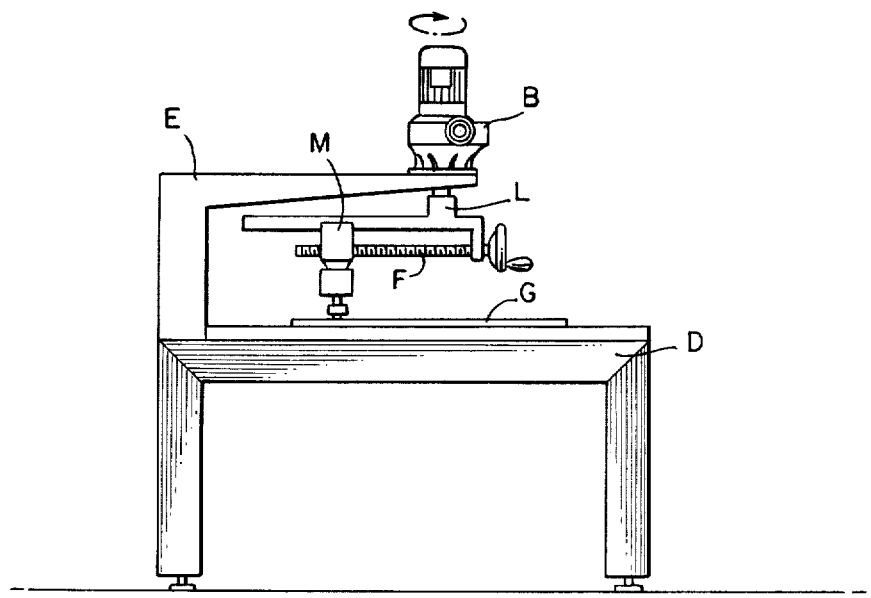
Figure 12:
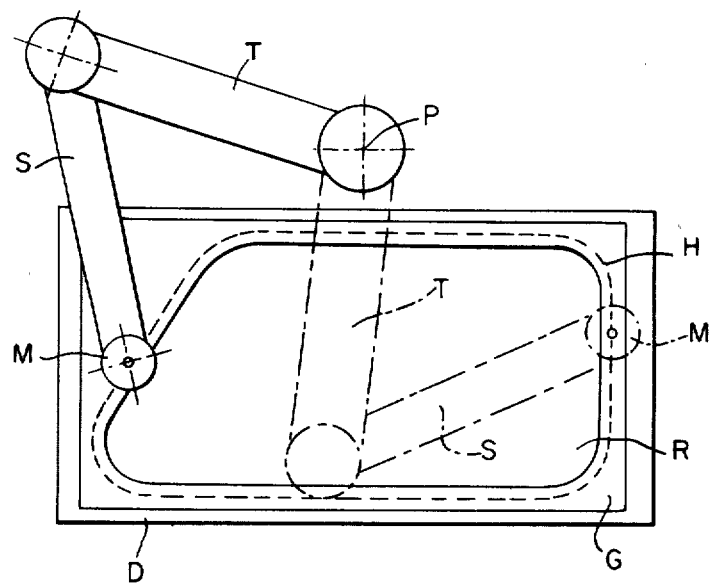

FIG. 1 shows a glass sheet section in accordance with its thickness, with the internal stress diagram above;

FIG. 2 represents a high thickness glass sheet section having been cut by means of the conventional procedure;

FIG. 3 shows a side view and an elevation of a roulette which is the integral part of the cutting device of the present invention;

FIG. 4 represents a schematic representation in which the irregularities in the cut by the invention procedure can be seen;

FIG. 5 represents a schematic representation in which the irregularities in the cut by the conventional procedure can be observed;

FIG. 6 represents a view showing the attack of the cutting roulette upon the glass sheet;

FIG. 7 is a detail view of the FIG. 6;

FIG. 8 is a detail view of the roulette's pointed angle according to the instant invention;

FIG. 9 represents a side elevational view of a glass cutting apparatus and a support therefor according to the disclosed invention with portions broken away to show various details in section; and FIG. 10 shows the structure of FIG. 9 with one mode of operation afforded by such structure with its bearing immobilized against rotation;

FIG. 11 shows the structure of FIG. 9 with a second mode of operation with its bearing still immobilized against rotation;

FIG. 12 also shows the structure of FIG. 9 with a third mode of operation with its bearing free to rotate;

FIG. 13 again shows the structure of FIG. 9 with a fourth mode of operation afforded by this same structure with its bearing free to rotate.

DETAILED DESCRIPTION OF THE INVENTION

By observing FIG. 1, one may see and relate three layers on a sheet of glass in accordance with the actuation direction on it of the material internal stresses.

On both surface layers 1 and 2, material internal stresses actuate at compression while on the internal layer 3, these stresses actuate at traction. This particular point is shown by the stress diagram line 4. The dotted line 5 indicates the stress neutral situation, and the passing of this line 5 from one side to the other of the curve 4 indicates the passing from a traction situation to another of compression or vice versa. Jointly, on those cutting points the layer separation is located.

In virtue of this general knowledge on the internal structure of a glass sheet, and in accordance with FIG. 2, we will proceed to give a theoretical explanation for the material's cutting in the conventional procedure.

As soon as the incision or fissure is made on the sheet surface in accordance with the line along which the cut is to be performed, a manual actuation is initiated by means of punches 15 with a quick blow in accordance with direction normal to the surface to bond the glass and apply a force on both sides of point 10. The application of this force N initiates an instantaneous flexure in the material which causes the internal stress diagram to undergo a deformation, and according to same, the lower layer 3' tends to widen and the upper layer 1' tends to decrease in thickness. The separation line 10 between this upper layer 1' and the central layer 2' undergoes an upward motion which moves it closer to the point of incision, with which as soon as this line is reached by the incision 10, the stresses in the traction direction of the central area 2 produce the tearing and cutting of the material.

This conventional prior art glass cutting procedure entails such problems as very slow operation and risk of glass breakage as that qualified and expert personnel are required for carrying out such operations. Moreover, after cutting glass in the known conventional manner, one obtains a rather big irregularity on the resulting edge, which requires polishing and/or finishing same, which is an operation which logically impinges upon the total cut.

Illustrative of this irregularity on the cutting edge, FIG. 5 represents the irregularity area 9' of sheet 8', as an area 9' comprehended in between lines R—R, and which must be removed when polishing.

The procedure according to the inventive concept uses a roulette illustrated in FIG. 3, having a number of very special qualities for attaining a very perfect cut on high thicknesses. This cutting roulette 6 comprises a disc-shaped body, on which periphery there is a double bevel which initiates a central cutting edge A, and which shapes a certain angle 7, which impinges upon the surface of the sheet that is to be cut, said angle 7 being illustrated on FIG. 8. In the center, the roulette 6 has a shaft running through it.

This roulette 6 will be mounted on a header or end of a housing on which one will be able to carry out, by means of a pantographic system or the like, so that the motion P for following the required cutting line may be maintained in parallel relationship to the planes 13, 16 of the glass sheet 8 which is supported on surface 14 of bed 12 and is to be cut.

This header will also be provided with a pneumatic cylinder which will supply a constant roulette 6 attack power or force Q, Q' on shaft portions 17, 18, respectively, on opposite sides of roulette 6 as indicated in FIG. 3 to cut the glass sheet. It is of vital importance for this power or force to be constant and perfectly perpendicular to the glass sheet, thus the need of the pneumatic cylinder.

For cutting different thicknesses of glass sheet it will be necessary to use different roulettes, and also to graduate the header pneumatic cylinder in accordance with the different values.

As a general rule, the roulette diameter will have to be the same as the thickness of the sheet that is to be cut.

Angle 7 of the roulette 6 is also solved with the thickness of the glass that is to be cut, for example, for an 8 mm. sheet thickness, angle 7 of the roulette 6 must be of 157°, and for a 25 mm. thickness, angle 7 of the roulette 6 to be used must be of 167°.

As to the power with which the roulette 6 impinges upon the glass, it is noted that for thicknesses of 8 to 10 mm., the pneumatic cylinder must be graduated at 85 Kgs, while for maximum thicknesses such as those around 25 mm., the power to be used would be of 160 Kgs.

FIG. 6 shows the general relationship of the roulette 6, being pressed towards the glass sheet 8 by a power M which is provided by a non-specified pneumatic cylinder. Point 11 indicates the separation between the top layer of compression internal stresses and the intermediate layer of traction internal stresses.

The theoretical explanation of why the cut is attained according to procedure of the inventive concept of the instant application will be understood upon considering FIG. 7.

Indeed, power M supplied by the pneumatic cylinder, initiates a first incision upon the glass sheet, and the action of the M components according to the orthogonal directions to the lips of roulettes T1 and T2, initiate an instantaneous material bending, which will deform the internal stress diagram of same, thus diminishing the thickness of the first compression layer, with the roulette cutting then reaching the intermediate traction layer and thus producing material tear.

Also, given the regulary of power M, the cutting irregularities will be much smaller than those produced on the conventional procedure. FIG. 4 shows this end, and it can be seen how the irregularity area 9 of sheet 8 which is comprehended between routes R—R, is much thinner than area 9' of FIG. 5, which corresponds to the conventional procedure.

Therefore, it is understood that, for the usage of applicant's procedure, it is necessary to have available roulettes of different characteristics in accordance with the different thicknesses to be cut, and it is also necessary to regulate in each case the power carried out by the roulette carrier header.

The studies and all experiments that have been carried out, have provided applicant with a formula which relates glass thickness to the roulette cutting angle determined by the two bevel surfaces:

Such formula is set forth below in which:

$$\text{Cutting angle} = 2 \times \text{arc sine}\left(1 - \frac{0.18}{\text{glass thickness}}\right)$$

From the foregoing description, the disclosed invention provides the following advantages:

(a) Quickness and safety in the operation, even for the highest thicknesses.

(b) Total elimination, or less need of edge polishing after cutting.

(c) No need of highly skilled manpower.

To carry out the objects mentioned above in connection with the disclosed inventive concept a preferred embodiment of a glass cutting apparatus according to the present invention is illustrated in FIG. 9. The cutting apparatus as illustrated in FIG. 9 comprises a cutting wheel 101 supported at the lower end of a rod 110 having a piston 118 at its upper end and a fluid cylinder 111 having an internal chamber 126 in which the piston 118 is disposed for response to fluid pressure transmitted through entrance or port 125 on top of cylinder head 121. The pressure may be furnished from a pneumatic source connected to the top of cylinder head 121 and transmitted through entrance 125 to chamber 126 which is constituted by casing 116 located and seated in place by means of the joints 117 between cylinder head 121 and the upper portion of cylinder 111. The cutting wheel 101 as assembled on rod 110 and cylinder 111 is seen to be mounted in FIG. 9 on support 124 and may be movably adjusted and/or removed when retaining screws 122 are loosened and/or removed as may be necessary.

The interior of cylinder 111 is seen in FIG. 9 to be provided with an axially extending passage which accommodates a circular guide 114 located between a latch member 115 at its upper end and a washer 113 and joint 112 at its lower end. Guide 114 extends around rod 110 which is connected to and supports at its upper end piston 118. To secure piston 118 to rod, 110 washer 119 and lock nut 120 members of known structure are provided. Piston 118 is assembled within cylinder 111 so as to slide through chamber 126 in such a way that when acted upon by or subjected to constant fluid pressure introduced from above through entrance 125, a constant pressure is obtained and transmitted in a constant force on rod 110. At the lower end of rod 110 a bearing support housing 123 is fixed thereto. In the interior of housing 123 there is provided a bearing unit 108 for rotary action within housing 123, but may be locked or immobilized against rotation as will be seen hereinafter depending upon the selected mode of operation.

Extending downwardly from housing 123 is a cutter assembly 105 which includes cutting wheel 101 mounted thereon by bracket 103 and bolts or screws 104.

Bearing 108 is located on cylindrical stub portion 135 extending up from shoulder 136 which is surrounded by joint 106 and nut 107. When nut 107 is tightened, it immobilizes the bearing 108 and consequently cylindrical stub portion 135 will not turn and the wheel 101 moves in a straight line while turning. On the contrary, if the nut 107 is loosened, the bearing 108 turns and the wheel 101 will turn over the mobile body or cutter assembly 105 which supports the cutting wheel 101.

With the cutter assembly described above in conjunction with FIG. 9 various modes of cutting operation are obtainable including modes A, B, C, and D described below. The modes of operation are determined in the apparatus by whether bearing 108 is fixed or is free to turn. Specifically, modes A and B are obtainable when bearing 108 is fixed and modes C and D are obtainable when bearing 108 is free to turn.

MODE A OPERATION

In accordance with the inventive concept disclosed herein the cutting apparatus of FIG. 9 is mounted for operation represented as Mode A in FIG. 10. Looking now to FIG. 10, the cutting apparatus designated by the letter M will be understood to be secured on support arm E of table D in cutting position over sheet or plate glass G, which in turn is supported by a rotary turntable B and pulley support wheel C. Rotation of turntable B is or may be effected by hand or a motor equipped with speed or gear reduction member. Cutting wheel 101 and pulley support wheel C as may be understood from FIG. 10 should be in substantial alignment and may be advanced or withdrawn together radially with respect to the center of turntable B by rotating radial control spindle F which is equipped with a handwheel. As has been set forth above, Mode A operation is effected with nut 107 tightened to immobilize or fix bearing 108 against rotation and thus prevent rotation of cylindrical stub portion 135 and confine cutting wheel 101 to rotation only about its axis.

MODE B OPERATION

In accordance with an alternative cutting operation represented as Mode B in FIG. 11, the cutting apparatus M, previously discussed in conjunction with FIGS. 9 and 10, is adjustably secured for cutting operation on a support unit L, which is rotatably suspended from rotary member B secured on support arm E. In carrying out the operation according to Mode B, a sheet or plate of glass G is placed on table D with cutting apparatus M located thereover by adjustment of radial control spindle F provided on support unit L, which in operation is rotated by rotary member B. Rotary member B as pointed out previously may be operated by hand, but preferably should be a motor equipped with a speed or gear reduction member. In Mode B, as in Mode A, operation is effected with nut 107 tightened to immobilize or fix bearing 108 against rotation and thus prevented rotation of cylindrical stub portion 135 and confine cutting wheel 101 to rotation only about its axis.

MODE C OPERATION

In accordance with another alternative cutting operation represented as Mode C in FIG. 12, the cutting apparatus M, discussed hereinabove in conjunction with FIGS. 9-11, is supported on the free end of an arm T pivotally connected to a second arm S which in turn is pivotally secured about a point P. In operation according to Mode C a sheet or plate of glass G is placed on table D with a pattern R to be traced by cutting apparatus M superposed over glass G. As has been pointed out, operation in accordance with Mode C is effected with nut 107 loosened so that bearing 108 is free to turn thereby allowing cylindrical stub portion 135 and cutter assembly 105 to rotate about the axis of stub portion 135 while cutting wheel 101 is rotated about its axis and moved along the path defined by pattern R in cutting glass G to the shape of pattern R along cutting line H. In tracing the pattern R, cutting apparatus is manually operated so as to travel around pattern R as permitted by the articulation of arms T and S about the common joint and pivot point P.

MODE D OPERATION

Figure 13:
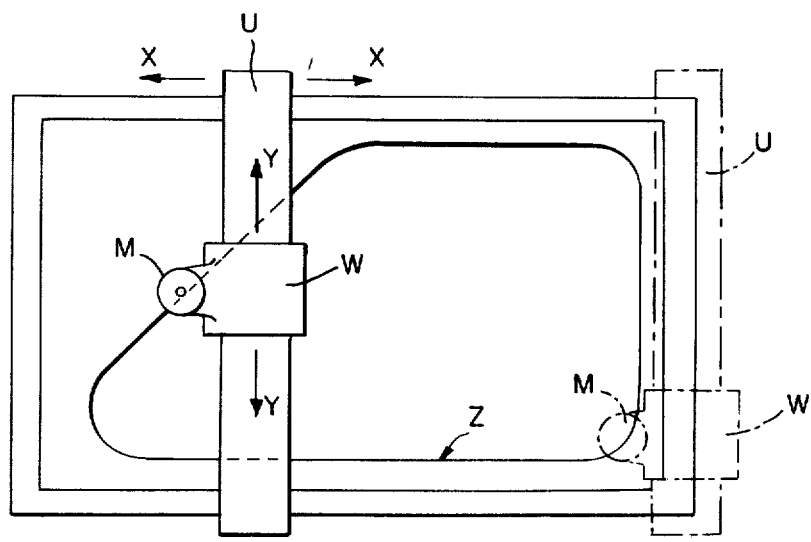

In accordance with yet another alternative cutting operation represented as Mode D in FIG. 13, the cutting apparatus M, discussed above in conjunction with FIGS. 9-12, is mounted on carriage members U and W for linear translatory movement in the X and Y axes, respectively, for example. Carriages U and W are automatically operated by numeric control means to follow a predetermined trajectory to effect cutting a selected form along line Z so that when cutting apparatus M completes a turn, the glass is cut. As in the case of Mode C, operation of cutting apparatus M according to Mode D is effected with nut 107 loosened so that bearing 108 is free to turn and allow rotation of stub portion 135 and cutter assembly 105 about the axis of stub portion 135 while cutting wheel is rotated about its own axis along the path defined and controlled by a numeric system along line Z from the solid to dotted positions, for example.

In each of the Modes A, B, C, and D operations, cutting apparatus M is subjected to fluid pressure transmitted through entrance 125 to chamber 126 to provide a constant force on rod 110 and on cutting wheel 101.

It will be obvious to those skilled in the art that various changes may be made without departing from the scope of the invention and the invention is not to be considered limited to what is shown in the drawings and described in the specification.

What is claimed is:

1. In a method of cutting a piece of glass with a rotary glass-cutter supported for rotation about a generally horizontal axis to move along a path relative to the piece of glass to be cut, the steps of
   measuring the thickness of the piece of glass to be cut,
   selecting a rotary cutter having a diameter substantially in the range of nearly equal to the thickness of said piece of glass to twice the thickness of said piece of glass,
   selecting a cutting angle on said rotary cutter equal to substantially $$2 \times \text{arc sine} \left(1 - \frac{0.18}{\text{the thickness of the glass}}\right)$$

with the angle measured in sexagesimal degrees and the thickness of the glass measured in millimeters,
   applying a constant pressure on said rotary cutter as it moves along the surface of said piece of glass in order to sever said piece of glass completely through its thickness along the line of cutting by a single stroke of said cutter along the surface of said piece of glass solely by the action of said cutter.

* * * * *